(12) United States Patent
Bhaduri et al.

(10) Patent No.: US 11,941,667 B2
(45) Date of Patent: *Mar. 26, 2024

(54) TECHNIQUES FOR IMPLEMENTING ADVERTISEMENT AUCTIONS ON CLIENT DEVICES

(71) Applicant: Apple Inc., Cupertino, CA (US)

(72) Inventors: Kanishka Bhaduri, Sunnyvale, CA (US); Bernard H. Everson, Santa Clara, CA (US); Jeremy M. Bunyard, Sunnyvale, CA (US); Boon C. Hwang, San Rafael, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,743

(22) Filed: May 2, 2022

(65) Prior Publication Data

US 2022/0335480 A1    Oct. 20, 2022

Related U.S. Application Data

(63) Continuation of application No. 16/854,841, filed on Apr. 21, 2020, now Pat. No. 11,361,347.

(60) Provisional application No. 62/861,917, filed on Jun. 14, 2019.

(51) Int. Cl.
*G06Q 30/02* (2023.01)
*G06Q 30/0241* (2023.01)
*G06Q 30/0242* (2023.01)
*G06Q 30/0273* (2023.01)

(52) U.S. Cl.
CPC ...... *G06Q 30/0275* (2013.01); *G06Q 30/0246* (2013.01); *G06Q 30/0247* (2013.01); *G06Q 30/0276* (2013.01)

(58) Field of Classification Search
CPC .............. G06Q 30/0251; G06Q 30/02; H04N 21/4668; G06F 16/27
See application file for complete search history.

(56) References Cited

U.S. PATENT DOCUMENTS

| 8,897,586 | B2 | 11/2014 | Dorairaj |
| 9,177,225 | B1 | 7/2015 | Munguia |
| 2009/0032155 | A1 | 2/2009 | Matsuzawa |

(Continued)

*Primary Examiner* — Saba Dagnew
(74) *Attorney, Agent, or Firm* — DICKINSON WRIGHT RLLP

(57) ABSTRACT

Embodiments set forth techniques for managing advertisement auctions on a client device. The method can include the steps of (1) receiving, from a server device, a plurality of objects, where each object is associated with a respective digital asset, and each object includes, in association with the respective digital asset (i) a server-derived digital asset vector, (ii) a server-derived predicted tap-through rate, and (iii) a bid amount. In turn, and for each object of the plurality of objects, the client device (2) generates a respective estimated cost per impression for the object based on the information provided by the server device as well as information derived by the client device. Subsequently, the client device (3) identifies, among the plurality of objects, the object associated with the highest respective estimated cost per impression, and (4) causes an advertisement for the respective digital asset associated with the identified object to be displayed.

20 Claims, 13 Drawing Sheets

(56) References Cited

U.S. PATENT DOCUMENTS

| | | |
|---|---|---|
| 2010/0169176 A1 | 7/2010 | Turakhia |
| 2010/0293566 A1 | 11/2010 | Valdez |
| 2011/0307350 A1* | 12/2011 | Kamimaeda ............ G06Q 30/02 |
| | | 705/26.7 |
| 2013/0080265 A1* | 3/2013 | Francis .............. G06Q 30/0251 |
| | | 705/14.71 |
| 2013/0080330 A1 | 3/2013 | Francis et al. |
| 2014/0201147 A1* | 7/2014 | Wadycki ................. G06F 16/27 |
| | | 707/637 |
| 2015/0227883 A1 | 8/2015 | Murphy, Jr. |
| 2015/0363820 A1 | 12/2015 | Leitersdorf et al. |
| 2019/0069030 A1* | 2/2019 | Jackman ............ H04N 21/4668 |

* cited by examiner

| Digital Asset | DA_1 | DA_2 | DA_3 | DA_4 | DA_5 |
|---|---|---|---|---|---|
| Digital Asset Vector | DAV_1 | DAV_2 | DAV_3 | DAV_4 | DAV_5 |
| Server Predicted Tap Through Rate (PTTR) | 0.2 | 0.003 | 0.4 | 0.1 | 0.6 |
| Bid Amount | $1 | $0.5 | $2 | $3 | $0.25 |

Server Device 110
Client Device 130

Server Device 110

| Digital Asset | DA_1 | DA_2 | DA_3 | DA_4 | DA_5 |
|---|---|---|---|---|---|
| Digital Asset Vector | DAV_1 | DAV_2 | DAV_3 | DAV_4 | DAV_5 |
| Server-PTTR | 0.2 | 0.003 | 0.4 | 0.1 | 0.6 |
| Bid Amount | $1 | $0.5 | $2 | $3 | $0.25 |
| Server-ECPM = Bid × Server-PTTR | $0.2 | $0.0015 | $0.8 | $0.3 | $0.15 |

| Server-Generated Ordering | DA_3 | DA_4 | DA_1 | DA_5 | DA_2 |
|---|---|---|---|---|---|

Client Device 130

| Digital Asset | DA_1 | DA_2 | DA_3 | DA_4 | DA_5 |
|---|---|---|---|---|---|
| Digital Asset Vector | DAV_1 | DAV_2 | DAV_3 | DAV_4 | DAV_5 |
| Server-PTTR | 0.2 | 0.003 | 0.4 | 0.1 | 0.6 |
| Bid Amount | $1 | $0.5 | $2 | $3 | $0.25 |

| User History Vector | UHV | UHV | UHV | UHV | UHV |
|---|---|---|---|---|---|
| Sim = Compare(UHV, DAV_X) | 0.09 | 0.9 | 0.3 | 0.9 | 0.1 |

*FIG. 2D*

Server Device 110

| Digital Asset | DA_1 | DA_2 | DA_3 | DA_4 | DA_5 |
|---|---|---|---|---|---|
| Digital Asset Vector | DAV_1 | DAV_2 | DAV_3 | DAV_4 | DAV_5 |
| Server-PTTR | 0.2 | 0.003 | 0.4 | 0.1 | 0.6 |
| Bid Amount | $1 | $0.5 | $2 | $3 | $0.25 |
| Server-ECPM = Bid x Server-PTTR | $0.2 | $0.0015 | $0.8 | $0.3 | $0.15 |

| Server-Generated Ordering | DA_3 | DA_4 | DA_1 | DA_5 | DA_2 |
|---|---|---|---|---|---|

Client Device 130

| Digital Asset | DA_1 | DA_2 | DA_3 | DA_4 | DA_5 |
|---|---|---|---|---|---|
| Digital Asset Vector | DAV_1 | DAV_2 | DAV_3 | DAV_4 | DAV_5 |
| Server-PTTR | 0.2 | 0.003 | 0.4 | 0.1 | 0.6 |
| Bid Amount | $1 | $0.5 | $2 | $3 | $0.25 |
| User History Vector | UHV | UHV | UHV | UHV | UHV |
| Sim = Compare(UHV, DAV_X) | 0.09 | 0.9 | 0.3 | 0.9 | 0.1 |
| Client-PTTR = Server-PTTR x Sim | 0.018 | 0.0027 | 0.12 | 0.09 | 0.06 |

*FIG. 2E*

TECHNIQUES FOR IMPLEMENTING ADVERTISEMENT AUCTIONS ON CLIENT DEVICES

CROSS-REFERENCE TO RELATED APPLICATIONS

The present application is a continuation of U.S. application Ser. No. 16/854,841, filed Apr. 21, 2020, entitled "TECHNIQUES FOR IMPLEMENTING ADVERTISEMENT AUCTIONS ON CLIENT DEVICES," issued Jun. 14, 2022 as U.S. Pat. No. 11,361,347, which claims the benefit of U.S. Provisional Application No. 62/861,917, entitled "TECHNIQUES FOR IMPLEMENTING ADVERTISEMENT AUCTIONS ON CLIENT DEVICES," filed Jun. 14, 2019, the content of which is incorporated herein by reference in its entirety for all purposes.

FIELD

The described embodiments relate generally to implementing advertisement auctions on client devices. More particularly, the embodiments relate to utilizing on-device data and on-device machine learning to improve the overall relevance of advertisements that are displayed on client devices to users. In this regard, the on-device data is not shared with server devices, which enhances the overall privacy interests of the users.

BACKGROUND

The proliferation of online advertising on computing devices has established serious privacy concerns that have yet to be addressed. In many cases, advertisement servers collect, store, and analyze vast amounts of information on individuals to form personal profiles on them. This information can include geographical information, conversational information, transactional information, search history information, browse history information, and so on. In turn, the personal profiles can be utilized by the advertisement servers when performing advertisement auctions to identify and present advertisements that are relevant to the individuals. Unfortunately, these conventional approaches do not offer alternative techniques that provide the same relevant advertisements while avoiding the collection, storage, and analysis of users' personal information on the advertisement servers. Consequently, individuals have essentially been forced—despite their general disapproval—to accept such server-based data collection practices as commonplace.

SUMMARY

In view of the privacy concerns associated with conventional online advertisement approaches, representative embodiments set forth herein disclose techniques for enabling relevant advertisements to be presented to individuals without collecting, storing, and analyzing their data on server devices. Instead, information for potential advertisements is securely provided to a given client device. In turn, the client device analyzes user data stored locally on the client device to refine the potential advertisements, and subsequently displays the advertisement(s) that is/are most relevant in view of the analysis. In this regard, the user data is not transmitted to, stored by, or analyzed by any server device, which substantially improves the user's overall privacy interests.

Accordingly, one embodiment sets forth a method that involves a server device enabling a client device to perform an advertisement auction. According to some embodiments, the method can be implemented by the server device, and include the steps of (1) receiving, from the client device, a request for information associated with a plurality of digital assets, (2) identifying, among the plurality of digital assets, a subset of digital assets that are registered to participate in an advertisement auction associated with the request, where each digital asset of the subset of digital assets is associated with (i) a server-derived digital asset vector, (ii) a server-derived predicted tap-through rate, and (iii) a bid amount. In turn, the steps further include (3) bundling each digital asset of the subset of digital assets—along with its associated data elements (i), (ii), and (iii)—into a respective object to form a plurality of objects, and (4) providing the plurality of objects to the client device. In turn, the client device locally-performs the advertisement auction by analyzing the plurality of objects against user data stored on the client device (where the user data is not stored on the server device). In doing so, the client device identifies—without revealing the user data to the server device—a most-relevant digital asset for which an advertisement should be displayed.

Additionally, and in accordance with the foregoing technique, the embodiments also set forth a method for implementing an advertisement auction on a client device. According to some embodiments, the method can be implemented at the client device, and include the step of (1) receiving, from a server device, a plurality of objects, where each object is associated with a respective digital asset, and each object includes, in association with the respective digital asset (i) a server-derived digital asset vector, (ii) a server-derived predicted tap-through rate, and (iii) a bid amount. The method can also include the step of (2) obtaining a client-derived user history vector that represents the manner in which a user of the client device interacts with digital assets available on the client device. In turn, the client device can perform a series of steps (3)-(5) on each object of the plurality of objects. In particular, the steps include (3) generating a respective similarity for the object based on (i) the server-derived digital asset vector included in the object, and (ii) the client-derived user history vector, (4) generating a respective client-derived predicted tap-through rate for the object based on (i) the server-derived predicted tap-through rate included in the object, and (ii) the respective similarity for the object, and (5) generating a respective estimated cost per impression for the object based on (i) the bid amount included in the object, and (ii) the respective client-derived predicted tap through rate. In turn, the computing device can be configured to perform the additional steps of (6) identifying, among the plurality of objects, the object associated with the highest respective estimated cost per impression, and (7) causing an advertisement for the respective digital asset associated with the identified object to be displayed.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 2A-2G illustrate a sequence diagram of an example scenario in which an advertisement auction is implemented on a client device, according to some embodiments.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments can be practiced without some or all these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in enough detail to enable one skilled in the art to practice the described embodiments, it is understood that these examples are not limiting such that other embodiments can be used, and changes can be made without departing from the spirit and scope of the described embodiments.

Figure 1A:
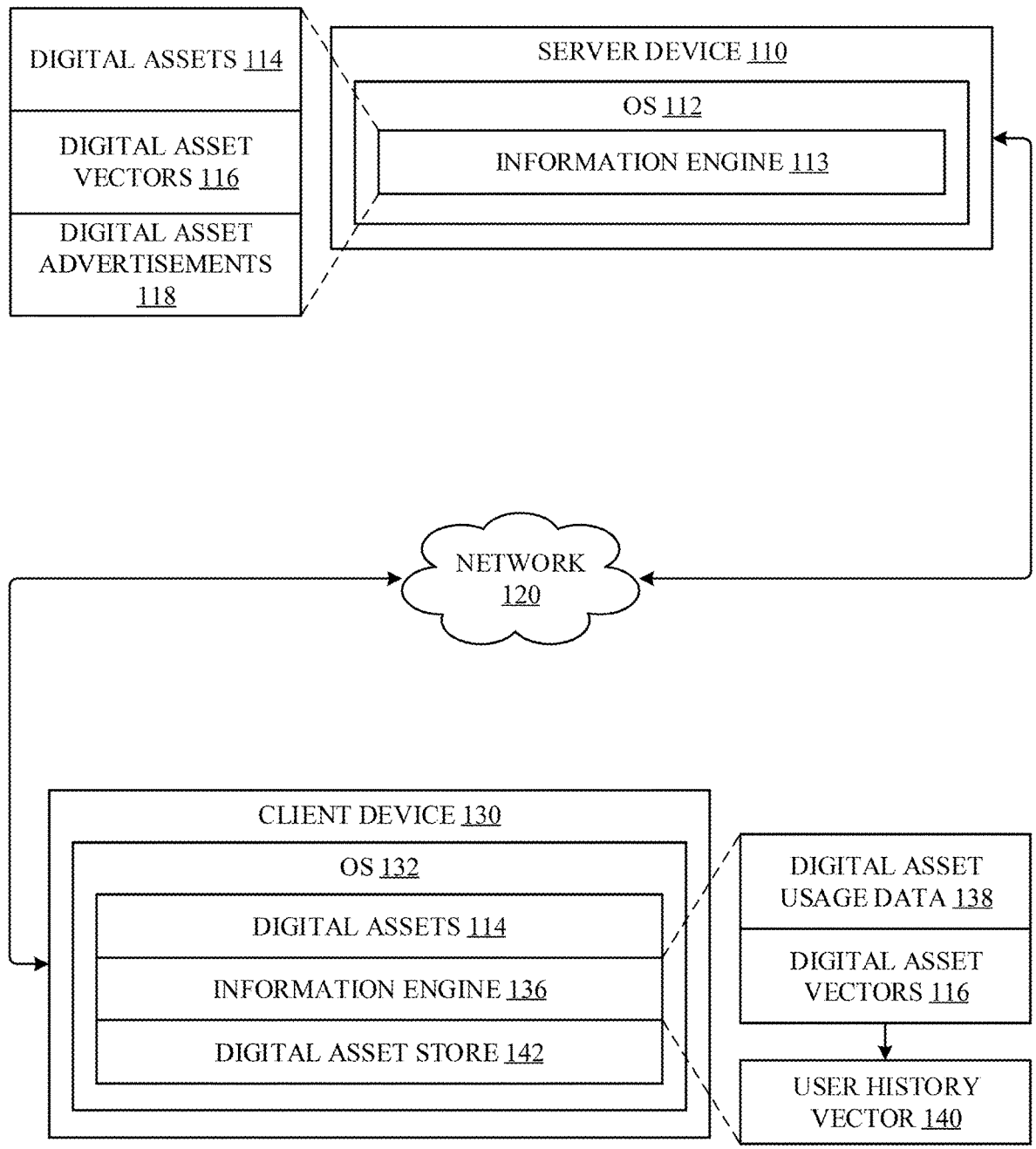
FIG. 1A illustrates a high-level overview of a computing device that can be configured to perform the various techniques described herein, according to some embodiments.
Figure 5:
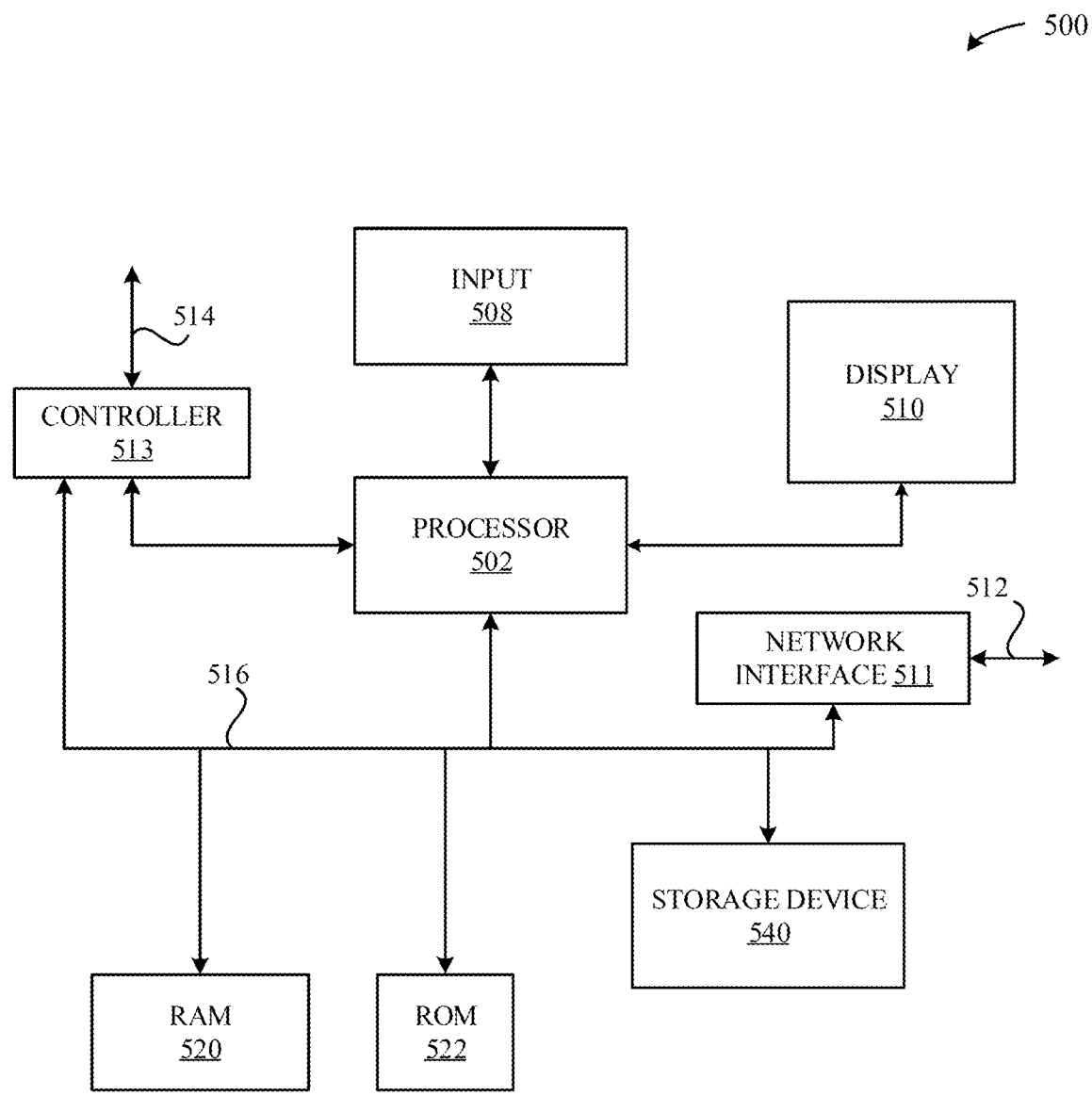
FIG. 5 illustrates a detailed view of a computing device that can represent the computing device of FIG. 1A used to implement the various techniques described herein, according to some embodiments.

FIG. 1A illustrates a high-level overview 100 of different computing devices—specifically, a server device 110 and a client device 130—that can be configured to perform the techniques described herein, according to some embodiments. Although not illustrated in FIG. 1A, it should be appreciated that both the server device 110 and the client device 130 can include a processor, a volatile memory (e.g., a Random-Access Memory (RAM)), and a non-volatile memory (e.g., a storage device). It is noted that a more detailed breakdown of example hardware components that can be included in the server device 110/client device 130 is illustrated in FIG. 5, and that these components are omitted from the illustration of FIG. 1A merely for simplification purposes. For example, each of the server device 110 and the client device 130 can include additional non-volatile memories (e.g., solid state drives, hard drives, etc.), other processors (e.g., a multi-core central processing unit (CPU)), and the like.

In any case, and as shown in FIG. 1A, the server device 110 can implement an operating system (OS) 112 that enables different applications to be executed on the server device 110, including an information engine 113. According to some embodiments, the information engine 113 can access various digital assets 114, where each digital asset 114 represents any form of data—e.g., a media file, a software package, etc.—that can be provided to the client device 130. As also shown in FIG. 1A, the information engine 113 can access digital asset vectors 116 that correspond to the digital assets 114, where each digital asset vector 116 is unique to a respective digital asset 114 and reflects various characteristics associated with the respective digital asset 114. For example, a given digital asset vector 116 can be composed of an array of floating point values (e.g., a 1×N array), where each floating point value corresponds to a particular characteristic associated with the digital asset 114. In this regard, two or more digital asset vectors 116 (corresponding to two or more respective digital assets 114) can be compared against one another—e.g., using cosine similarity—to identify how similar they are to one another, at least with regard to the characteristics that are captured by the two or more digital asset vectors 116. It is noted that each digital asset vector 116 can be associated with a version identifier to ensure that misaligned digital asset vectors 116 are not inadvertently compared against one another.

Figure 1B:
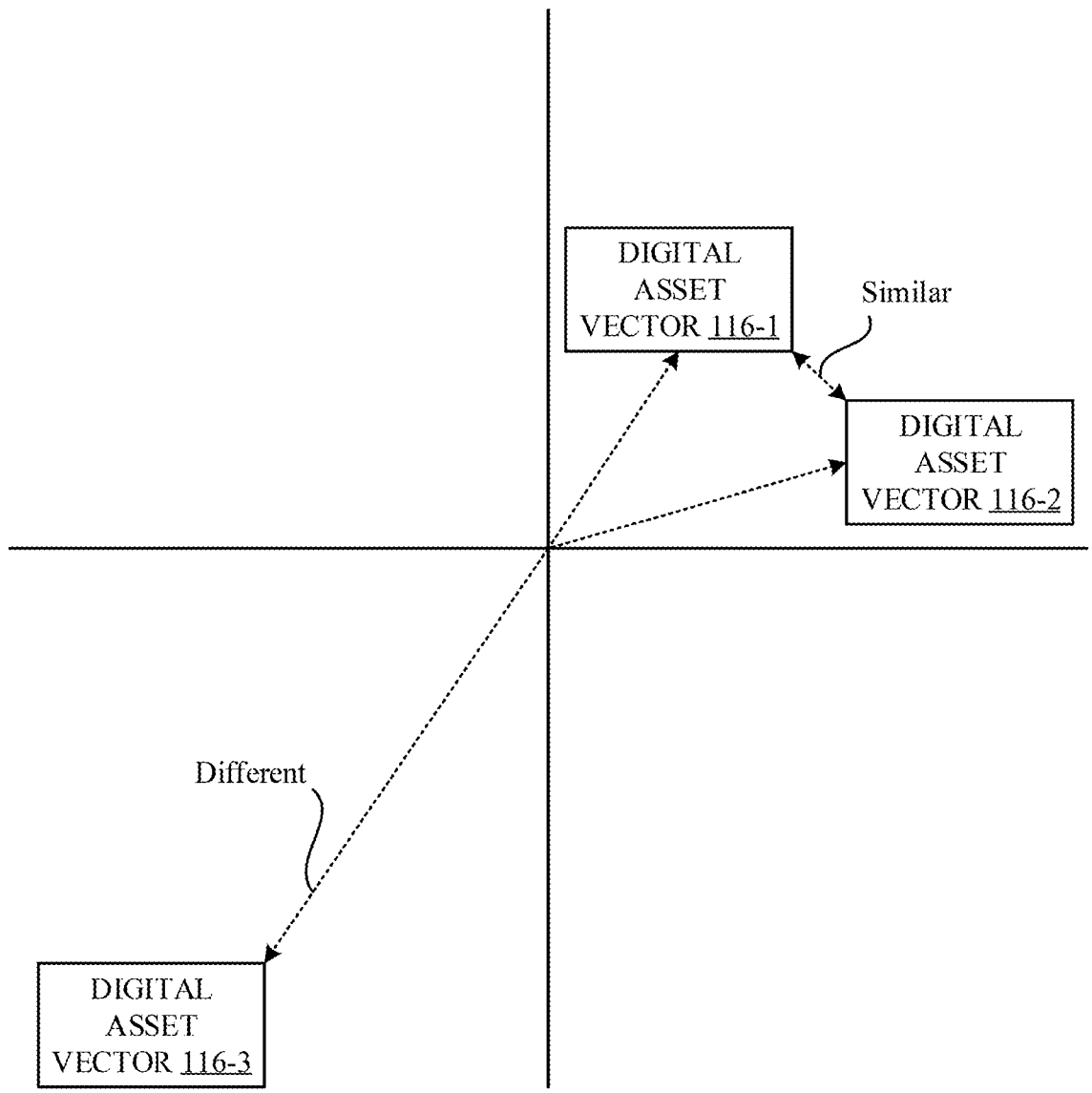
FIGS. 1B-1C illustrate conceptual diagrams of a technique that can be used to generate a user history vector based on two or more digital asset vectors, according to some embodiments.

The notion of similarities—as well as differences—between digital asset vectors 116 is illustrated in FIG. 1B, which includes an example comparison 150 of three digital asset vectors 116 that each occupy the same two-dimensional space. In particular, the similarity between the digital asset vector 116-1 and the digital asset vector 116-2 is illustrated by the proximity of these digital asset vectors 116 to one another within the two-dimensional space. Conversely, the difference between the digital asset vector 116-3 and the digital asset vector 116-1—as well as the difference between the digital asset vector 116-3 and the digital asset vector 116-2—is illustrated by the distance between these digital asset vectors 116 within the two-dimensional space.

Turning back now to FIG. 1A, it is additionally shown that the information engine 113 can access digital asset advertisements 118 that correspond to the digital assets 114. For example, a given digital asset advertisement 118 can identify a corresponding digital asset 114 (or vice-versa) that is known to the information engine 113. The digital asset advertisement 118 can also define various parameters with regard to how an advertisement associated with the digital asset 114 should be displayed (if at all). Such parameters can include, for example, search queries that should trigger an advertisement for the digital asset 114, monetary values—e.g., bid amounts—that will be paid when an advertisement for the digital asset 114 is displayed, converted, etc., data for the advertisement itself (e.g., GIF files, video files, images, animations, widgets, etc.), and so on. It should be noted that the foregoing examples are not meant to be limiting in any fashion, and that any electronic advertising approach can be utilized by the techniques described herein without departing from the scope of this disclosure.

As shown in FIG. 1A, the server device 110 can be configured to communicate with the client device 130 over a network 120 (e.g., a local network, the Internet, etc.). According to some embodiments, the client device 130 can implement an OS 132 that enables different entities to be accessed on the client device 130, including digital assets 114 (e.g., provided by the server device 110 or another device), an information engine 136, and a digital asset store 142. According to some embodiments, and as previously described above, each digital asset 114 illustrated within the client device 130 can represent a digital item (e.g., a software application, a media file, etc.) that is stored/installed on the client device 130.

According to some embodiments, and as shown in FIG. 1A, the information engine 136 can manage digital asset usage data 138, digital asset vectors 116 (e.g., provided by the server device 110 or another device), and a user history vector 140, which will now be described below in greater detail. It should be appreciated that the various information gathering techniques described herein are solely optional, and that a user of the client device 130 can, at any time, prohibit the information engine 136 from functioning in accordance with the techniques set forth herein.

According to some embodiments, the information engine 136 can form the digital asset usage data 138 based on the interactions that occur with the digital assets 114 on the client device 130. For example, the information engine 136 can be configured to take a daily snapshot of the access count (e.g., by a user of the client device 130) of each digital asset 114 for three intervals (last seven days, last three days, & last one day) at a pre-determined time (e.g., at midnight local time). These values can be managed using any effective approach without departing from the scope of this disclosure. For example, each digital asset 114 can be associated with an identifier that uniquely identifies the digital asset 114. Each digital asset 114 can also be associated with a "AccessCountLast30days" variable whose value (e.g., a float value) specifies the ratio of the access count of the digital asset 114 to the total access count of the digital asset 114 across the last seven days, a "AccessCountLast7days" variable whose value specifies the ratio of the access count of the digital asset 114 to the total access count of the digital asset 114 across the last three days, and so on. Additionally, each digital asset 114 can also be associated with a "AccessLikelihood" variable whose value (e.g., a floating point value) identifies a likelihood that the digital asset 114 will be accessed. It is noted that these values and their associated levels of granularity are merely exemplary and should not be construed as limiting in any fashion. On the contrary, the aforementioned metrics can be carried out in any fashion, and at any level of granularity, without departing from the scope of this disclosure.

According to some embodiments, and as shown in FIG. 1A, the information engine 136 can be configured to utilize the digital asset usage data 138 and the digital asset vectors 116 to generate the user history vector 140. It is noted that the client device 130 can receive a respective digital asset vector 116 for each digital asset 114 that is accessed by the client device 130. In this manner, each digital asset vector 116 is specific to a particular digital asset 114 regardless of the computing device on which the digital asset vector 116/digital asset 114 are stored. Notwithstanding this uniformity, the digital asset usage data 138 can be utilized to identify respective weights that should be applied when formulating the user history vector 140. In particular, the information engine 136 can be configured to identify, based on the foregoing access information, a respective weight for each digital asset vector 116 on the client device 130, and sum the weighted digital asset vectors 116 together to produce the user history vector 140. In this regard, the user history vector 140 occupies the same dimensional space as the digital asset vectors 116, and essentially represents where the user's preferences fall (at least at the time the user history vector 140 is generated). This notion is illustrated in the example comparison 160 of FIG. 1C.

It is noted that the foregoing approach for generating the user history vector 140 is not meant to be limiting in any fashion, and that any utilization of the digital asset usage data 138 and the digital asset vectors 116 can be performed in any manner without departing from the scope of this disclosure. It is additionally noted that the user history vector 140 can be updated in accordance with any form of a trigger without departing from the scope of this disclosure. For example, the information engine 136 can be configured to update the user history vector 140 in response to the addition/removal of a digital asset 114. In another example, the information engine 136 can be configured to update the user history vector 140 on a fixed-time basis (e.g., every twenty-four hours). In yet another example, the information engine 136 can be configured to update the user history vector 140 in response to the client device 130 preparing to display an advertisement, thereby ensuring that the most relevant advertisement will be displayed to the user.

Figure 1C:
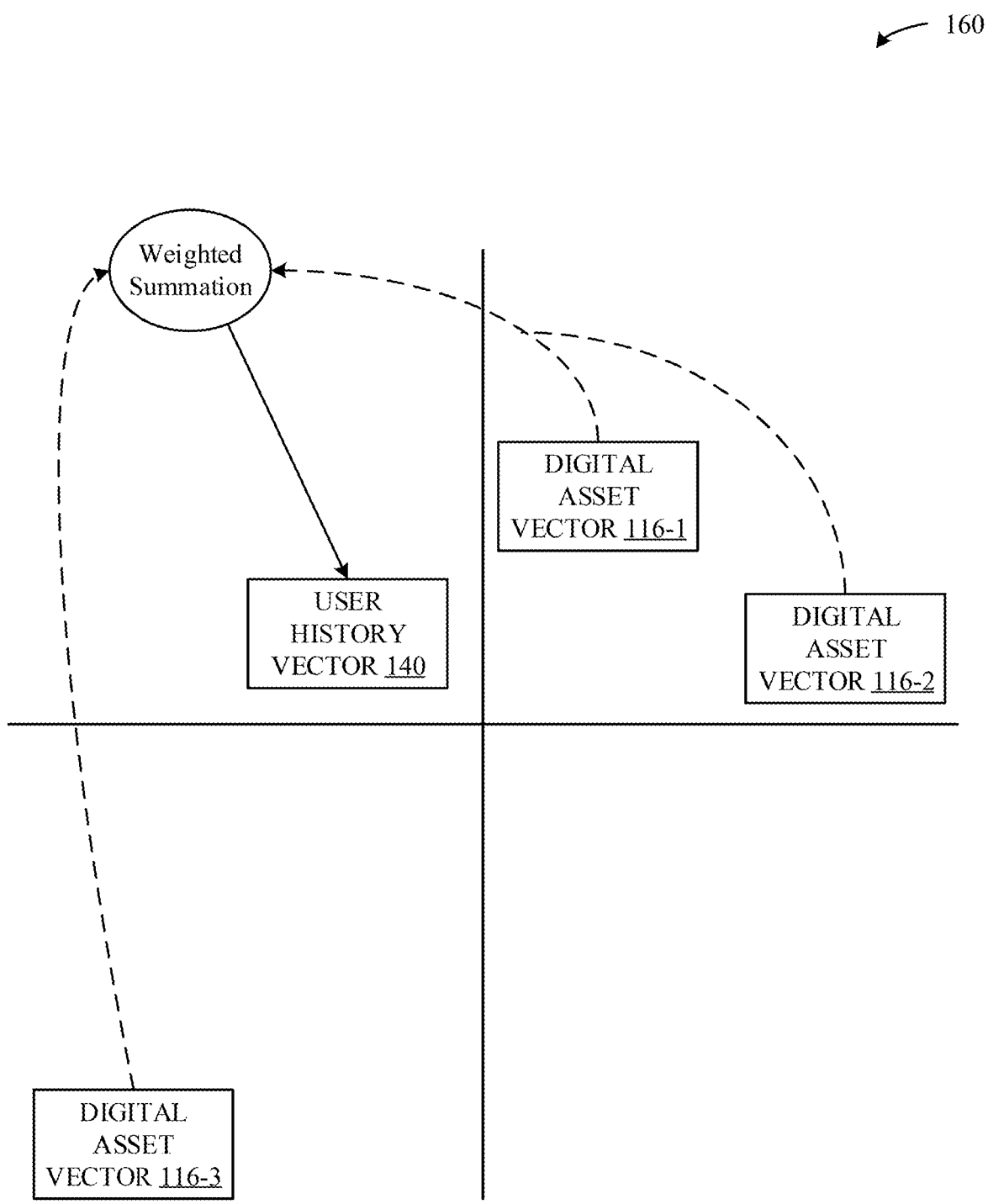

Accordingly, FIGS. 1A-1C illustrate example computing devices that can be configured to implement the techniques set forth herein. FIGS. 2A-2G and FIGS. 3-4, which will now be described below in detail, set forth additional details with regard to the manner in which advertisement auctions can be implement on the client device 130.

Figure 2A:
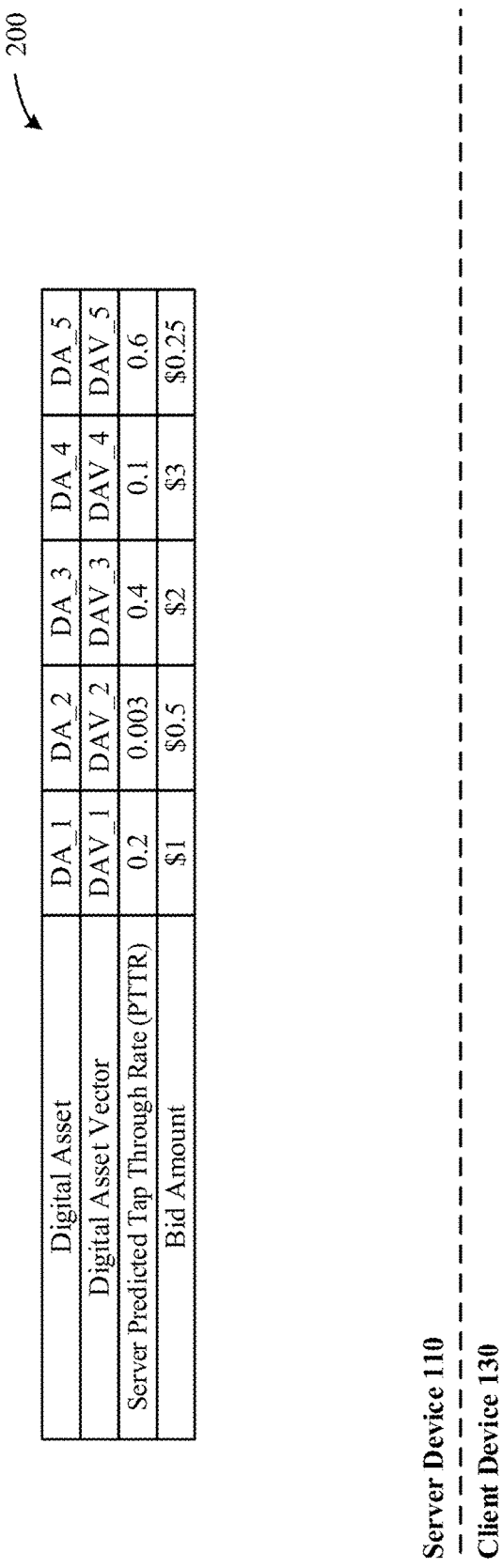

FIGS. 2A-2G illustrate a sequence diagram of an example scenario in which an advertisement auction is implemented on the client device 130, according to some embodiments. As shown in FIG. 2A, a first step 200 can involve the server device 110 receiving, from the client device 130, a request to view a collection of digital assets 114. In one example, the client device 130 can issue the request in response to receiving a search query via a user interface displayed at the client device 130 (e.g., within the digital asset store 142). In another example, the client device 130 can issue the request in conjunction with the digital asset store 142 loading a user interface that is designed to automatically display digital assets 114—e.g., top-ranked software applications, top-ranked music albums, top-ranked videos, and so on. It is noted that these examples are merely exemplary and should not be construed as limiting.

In any case, as shown in FIG. 2A, the server device 110 can identify, based on the request (or other information), five different digital assets 114 that should participate in the advertisement auction. An illustrative example scenario of identifying these digital assets 114 can involve the information engine 113 on the server device 110 receiving a query with the text "calendar applications" from the digital asset store 142 on the client device 130. In turn, the information engine 113 can analyze various digital asset vectors 116 (associated with digital assets 114) to identify a group of digital assets 114 that are the most relevant to the query. Subsequently, the information engine 113 can analyze the group of digital assets 114 to identify a sub-group of digital assets 114 that are associated with the highest monetary amounts for displaying advertisements associated with the digital assets 114. It is noted that any different/auxiliary filtration techniques, at any level of granularity, can be employed to identify digital assets 114 in response to queries without departing from the scope of this disclosure.

In accordance with FIG. 2A, the information engine 113 identifies five digital assets 114 that should participate in the advertisement auction, which are denoted as DA_1 through DA_5 (with associated digital asset vectors DAV_1 through DAV_5, respectively). As also shown in FIG. 2A, the information engine 113 also identifies, for each digital asset 114, an associated/respective server-predicted tap through rate ("server-PTTR"). According to some embodiments, the server-PTTR for a given digital asset 114 is a numerical representation of the similarity between the digital asset 114—specifically, the digital asset vector 116 associated with the digital asset 114—and the request that is issued by the client device 130. According to some embodiments, the server-PTTR can be generated using machine learning models that are formed through the analysis of training data over time. As described in greater detail below in conjunction with FIG. 2G, the client device 130 can also be configured to return data to the server device 110 after the advertisement auction is executed on the client device 130. In turn, the server device 110 can analyze the returned data to increase the overall accuracy of the models that it employs, thereby improving the initial relevance of the advertisement auction candidates that are initially transmitted to the client device 130 when subsequent advertisement auctions take place.

In any case, as shown in FIG. 2A, the digital asset 114 "DA_5"—which has the highest server-PTTR relative to the other digital assets 114—is the digital asset 114 for which an advertisement is most-likely to be selected, at least in relation to the request that is issued by the client device 130. Correspondingly, the digital asset 114 "DA_3" has the second-highest server-PTTR, the digital asset 114 "DA_1" has the third-highest server-PTTR, the digital asset 114 "DA_4" has the fourth-highest server-PTTR, and the digital asset 114 "DA_2" has the fifth-highest server-PTTR.

As additionally shown in FIG. 2A, each digital asset 114 can be associated with a respective bid amount, which represents an amount of money that an entity associated with the digital asset 114 has offered to pay when an advertisement for the digital asset 114 is selected in the advertisement auction. In this regard, the digital asset 114 "DA_4" is associated with the highest bid amount, followed by the digital asset 114 "DA_3", followed by the digital asset 114 "DA_1", followed by the digital asset 114 "DA_2", followed by the digital asset 114 "DA_5".

Figure 2B:
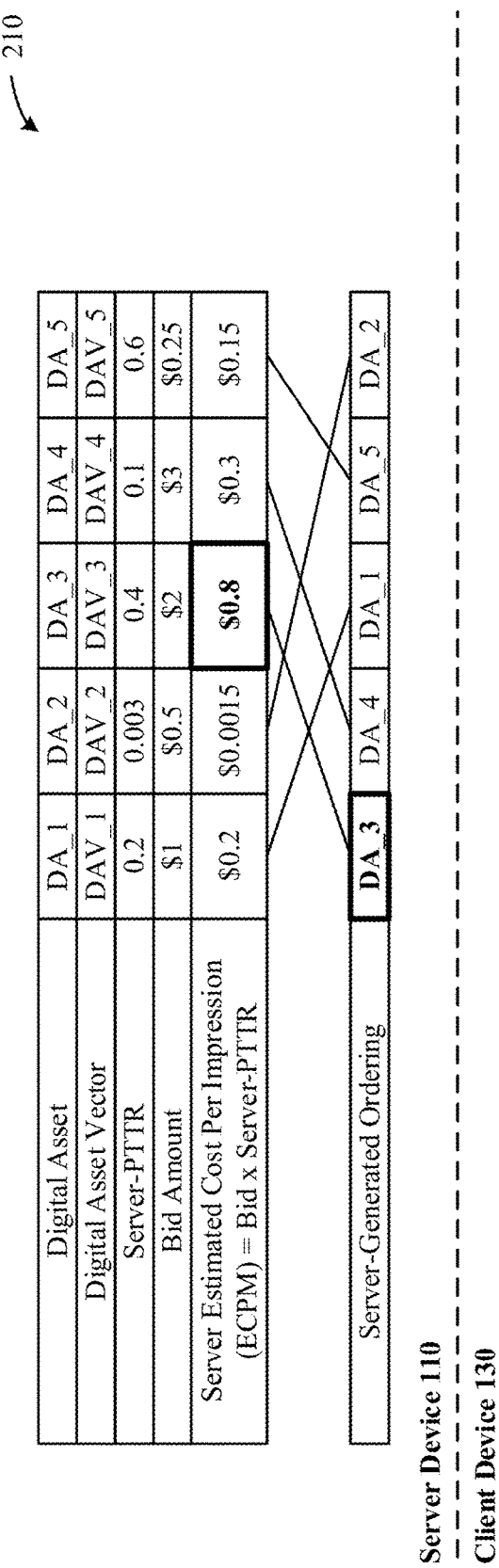

Turning now to FIG. 2B, an aside step 210 illustrates the manner in which the server device 110 would identify the digital asset 114 for which an advertisement should be displayed if the server device 110 (and not the client device 130, as described herein) were tasked to perform such an identification. In particular, the advertisement auction, when performed on the client device 130, considers additional information to which the server device 110 is not privy. Consequently, performing the advertisement auction on the client device 130 can yield different results that, beneficially, can be more tailored to the user's underlying preferences.

Accordingly, as shown in FIG. 2B, if the advertisement auction were performed on the server device 110, the server device 110/information engine 113 would determine a server-estimated cost per impression ("server-ECPM") for each of the digital assets 114. As shown in FIG. 2B, determining the server-ECPM for a given digital asset 114 can involve the information engine 113 multiplying (1) the respective bid amount for the digital asset 114, by (2) the respective server-PTTR for the digital asset 114. It is noted that any additional values can be considered when determining the server-ECPM without departing from the scope of this disclosure. In this regard, the information engine 113 would determine that the digital asset 114 "DA_3" is associated with the highest server-ECPM, followed by the digital asset 114 "DA_4", followed by the digital asset 114 "DA_1", followed by the digital asset 114 "DA_5", followed by the digital asset 114 "DA_2". This ordering is illustrated in FIG. 2B under the server-generated ordering, which indicates that the digital asset 114 "DA_3"—with a server-ECPM of $0.80—would prevail in the advertisement auction if it were conducted on the server device 110.

As previously mentioned above, when the advertisement auction is instead performed on the client device 130, the advertisement auction can yield different results/more relevant results in comparison to performing the advertisement auction on the server device 110. Accordingly, FIGS. 2C-2G illustrate the manner in which the server device 110 can cause the client device 130 to perform the advertisement auction, which will now be described in greater detail below.

Figure 2C:
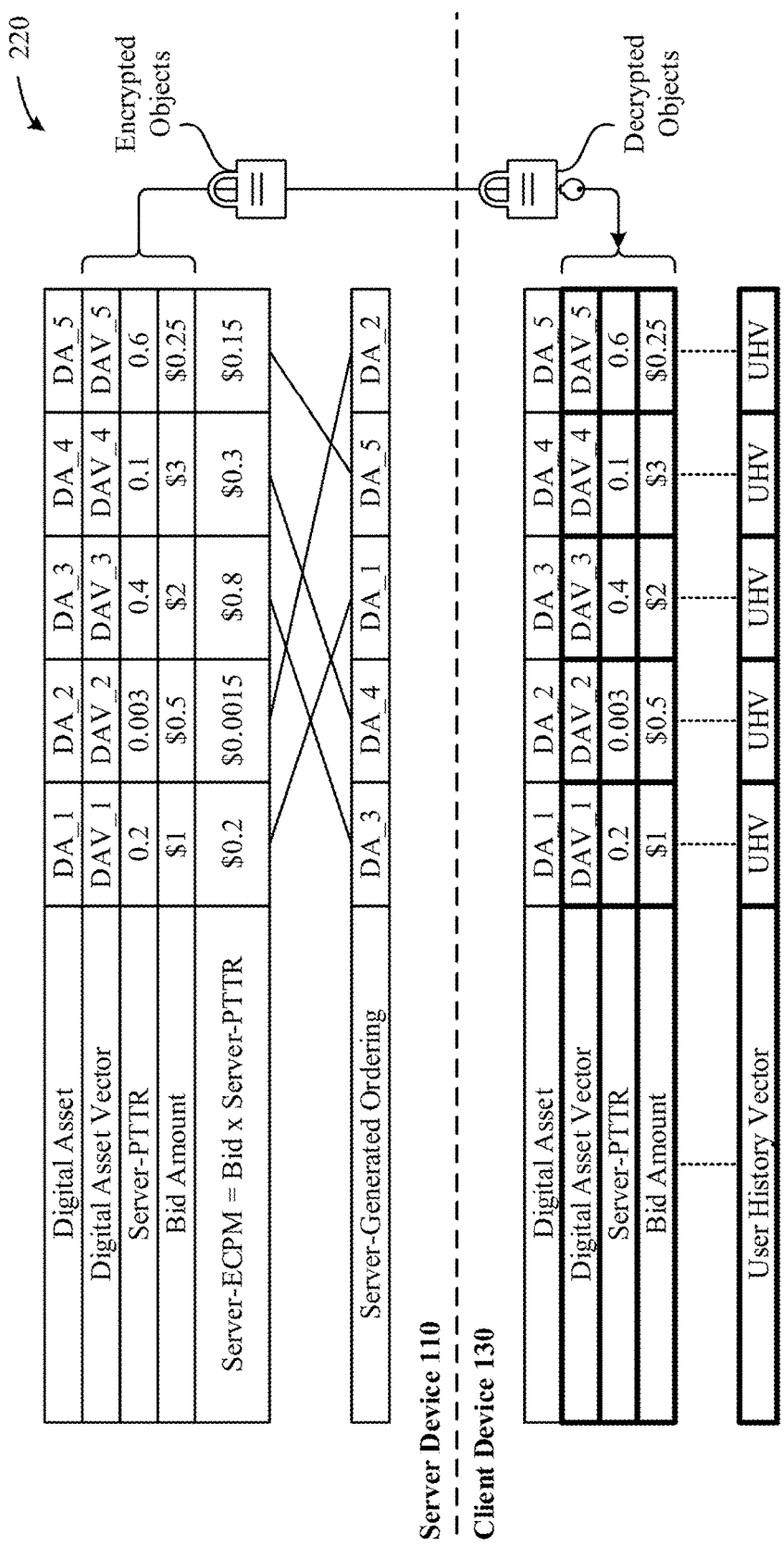

Accordingly, FIG. 2C illustrates a third step 220 that involves the server device 110/information engine 113 transmitting, to the client device 130/information engine 136, a respective object for each of the five digital assets 114 that are identified by the server device 110 (in accordance with the techniques described above in conjunction with FIGS. 2A-2B). According to some embodiments, the object for a given digital asset 114 can include the respective digital asset vector 116, the respective server-PTTR, and the respective bid amount. Notably, it is not necessary to include the respective server-ECPM for the digital asset 114, as this information is merely illustrative and does not impact the manner in which the advertisement auction is ultimately conducted on the client device 130. According to some embodiments, and as shown in FIG. 2C, each object can be encrypted by the server device 110 prior to transmitting the object to the client device 130, where the client device 130 is capable of decrypting the object. It is noted that any form of encryption can be utilized without departing from the scope of this disclosure. It is additionally noted that the server device 110 can package the individual objects together into a single object that is encrypted, where, in turn, the encrypted single object is decrypted and unpacked into the individual objects on the client device 130.

In any case, as shown in FIG. 2C, the client device 130/information engine 136 obtains the user history vector 140 in preparation to determine a respective similarity value (denoted "SIM" in FIG. 2C) for each of the digital assets 114/digital asset vectors 116 relative to the user history vector 140. In turn, FIG. 2D illustrates a fourth step 230, which involves the information engine 113 performing a comparison of the user history vector 140 against each of the digital asset vectors 116. As shown in FIG. 2D, the digital assets 114 "DA_2" and "DA_4" are tied for the highest similarity value relative to the user history vector 140, followed by the digital asset 114 "DA_3", followed by the digital asset 114 "DA_5", followed by the digital asset 114 "DA_1".

Turning now to FIG. 2E, a fifth step 240 can involve the client device 130/information engine 136 determining a client-predicted tap through rate ("client-PTTR") for each of the digital assets 114. As shown in FIG. 2E, determining the client-PTTR can involve multiplying (1) the server-PTTR for the digital asset 114 (provided by the server device 110), by (2) the similarity value for the digital asset 114 (calculated at step 230 of FIG. 2D). It is noted that any additional values can be considered when determining the client-pTTR without departing from the scope of this disclosure. In any case, as shown in FIG. 2E, the digital asset 114 "DA_3" has the highest client-PTTR, followed by the digital asset 114 "DA_4", followed by the digital asset 114 "DA_5", followed by the digital asset 114 "DA_1", followed by the digital asset 114 "DA_2".

Figure 2F:
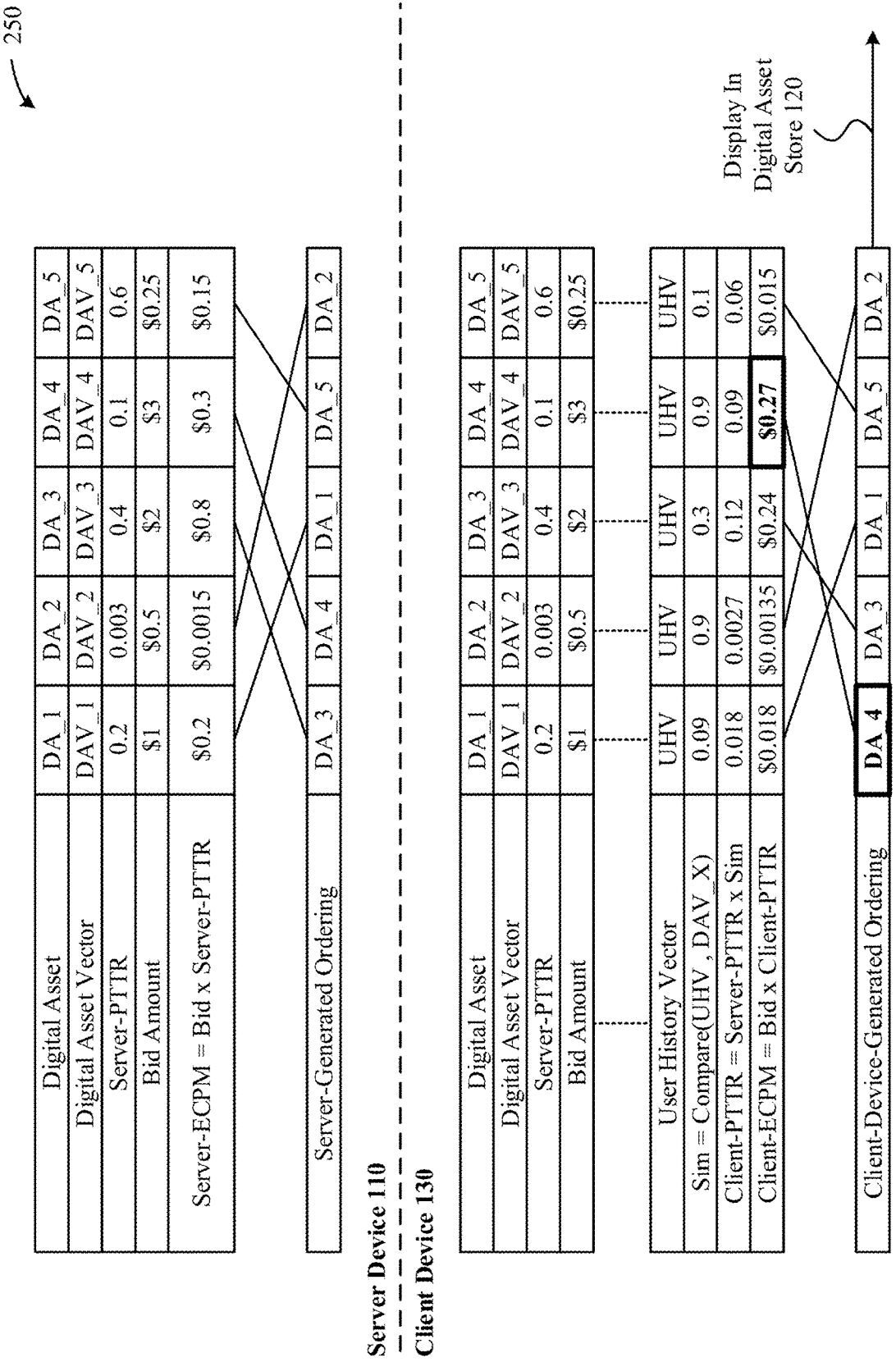
Figure 2G:
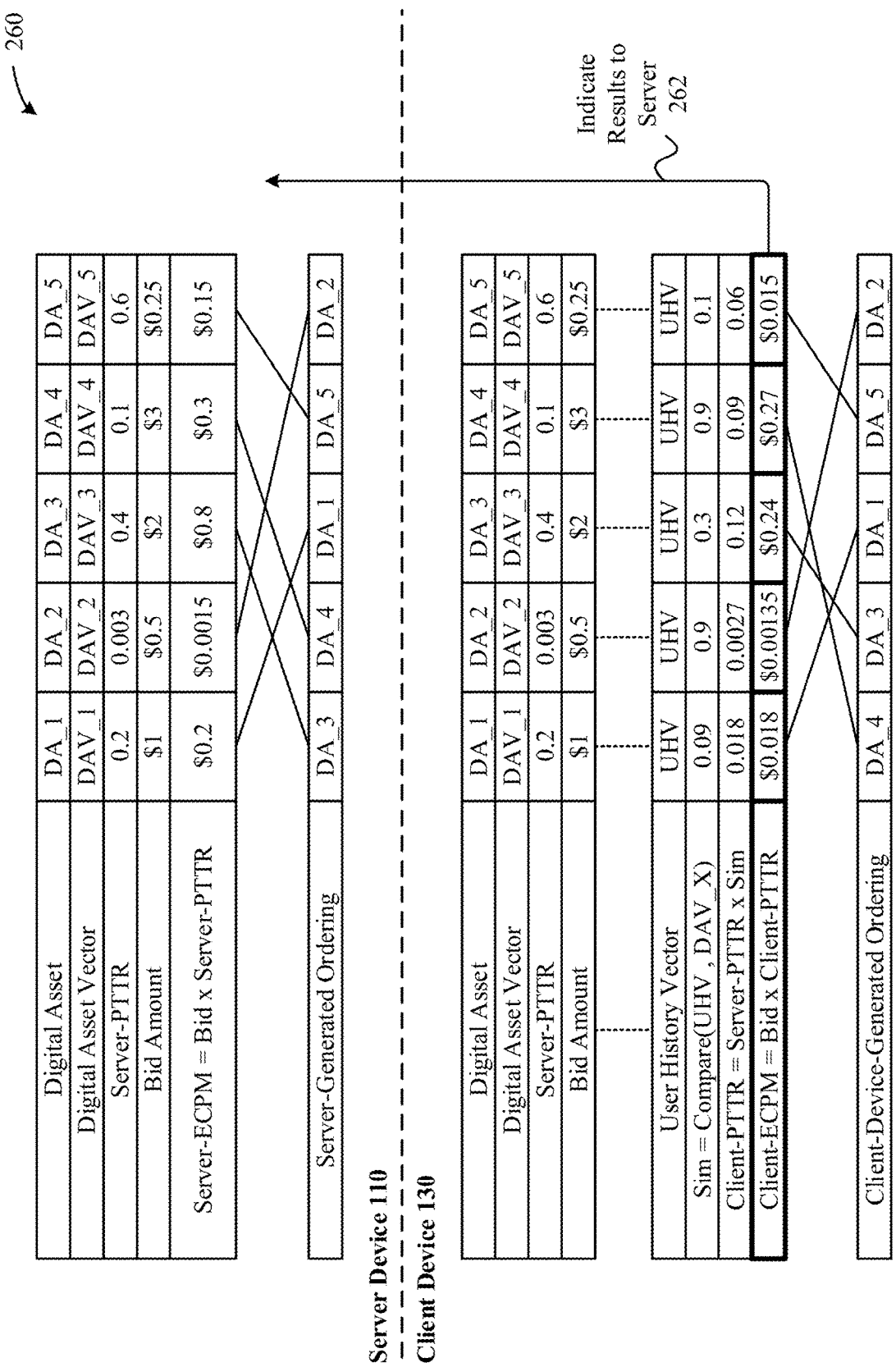

Additionally, and turning now to FIG. 2F, a sixth step 250 can involve the client device 130/information engine 136 determining a client-estimated cost per impression ("client-ECPM") for each of the digital assets 114. As shown in FIG. 2E, determining the client-ECPM can involve multiplying (1) the bid amount for the digital asset 114 (provided by the server device 110), by (2) the client-PTTR for the digital asset 114 (calculated at step 240 of FIG. 2E). It is noted that any additional values can be considered when generating the client-ECPM for a given digital asset 114 without departing from the scope of this disclosure. In any case, as shown in FIG. 2F, the digital asset 114 "DA_4" has the highest client-ECPM, followed by the digital asset 114 "DA_3", followed by the digital asset 114 "DA_1", followed by the digital asset 114 "DA_5", followed by the digital asset 114 "DA_2".

Additionally, the sixth step 250 of FIG. 2F can involve the client device 130/information engine 136 identifying that the digital asset 114 "DA_4" should be selected as the winner of the advertisement auction because the digital asset 114 has the highest client-ECPM. Accordingly, the information engine 136 can obtain the appropriate advertisement data for the digital asset 114 (e.g., GIF files, video files, images, animations, widgets, etc.) and cause the advertisement to be displayed within a user interface of the digital asset store 142 on the client device 130. It is noted that the advertisement data can be included within the aforementioned objects provided by the server device 110. Alternatively, the advertisement data can be obtained on-demand, e.g., at the conclusion of the advertisement auction, to eliminate the transmission of extraneous data (i.e., advertisement data that ultimately is not displayed). It is additionally noted that other entities can participate in the transmission of the advertisement information, e.g., advertisement servers with which the server device 110 and/or client device 130 are configured to communicate, and so on. It should be understood that the foregoing approaches are exemplary and should not be construed as limiting. On the contrary, the server device 110/client device 130—as well as any other participating entities—can be configured to communicate advertisement information between one another, in any fashion and at any level of granularity, without departing from the scope of this disclosure.

In any case, at the conclusion of FIG. 2F, an advertisement for the digital asset 114 "DA_4" can displayed within the user interface of the digital asset store 142 on the client device 130. Additionally, a seventh step 260 in FIG. 2G can involve the client device 130/information engine 136 indicating to the server device 110/information engine 113 the results of the advertisement auction performed on the client device 130 (as shown in supplemental sub-step 262). This can involve, for example, transmitting any information about the advertisement auction that can enable the server device 110 to bill the appropriate amount to the entity that oversees the advertisements for the digital asset 114 "DA_4". For example, the server device 110 can be configured to identify the client-ECPM for the digital asset 114 that placed second in the advertisement auction, and bill that amount to the entity (commonly referred to as a Vickrey auction). It is noted that the foregoing approach is merely exemplary and should not be construed as limiting in any manner. On the contrary, any approach for implementing billing—at any level of granularity—can be utilized without departing from the scope of this disclosure.

Additionally, it is noted that the information transmitted by the client device 130 to the server device 110 can enable the server device 110 to increase the accuracy of the machine learning models that are employed by the server device 110 (e.g., when generating server-PTTRs). In particular, the server device 110 can be configured to compare the results server-generated ordering against the client-device-generated ordering (illustrated in FIG. 2G) to identify factors that lead to the inaccurate prediction that was calculated by the server device 110. In this regard, the server device 110 can communicate with numerous client devices 130 to implement corrective measures (where appropriate) with the interest of increasing the overall accuracy of the machine learning models employed by the server device 110.

Additionally, it is noted that when the client device 130/information engine 136 transmits the results of the advertisement auction to the server device 110/information engine 113, the client device 130 can be configured to filter (i.e., omit) information in the interest of privacy protection. In particular, the client device 130/information engine 113 can be configured to transmit only the client-ECPM values and omit the user history vector 140, the similarity values, and the client-PTTR values. In this regard, the server device 110/information engine 113 will remain largely incapable of ascertaining the user history vector 140, thereby protecting the user's privacy.

Accordingly, FIGS. 2A-2G provide a detailed example of the manner in which the server device 110 and the client device 130 can work in conjunction to enable an advertisement auction to take place on the client device 130 in the interest of protecting the user's privacy. Additionally, FIG. 3 sets forth a high-level method diagram that breaks down the responsibilities of the server device 110 when implementing advertisement auctions, while FIG. 4 sets forth a high-level method diagram that breaks down the responsibilities of the client device 130 when implementing advertisement auctions. These high-level method diagrams will now be described below in greater detail in conjunction with FIGS. 3-4.

Figure 3:
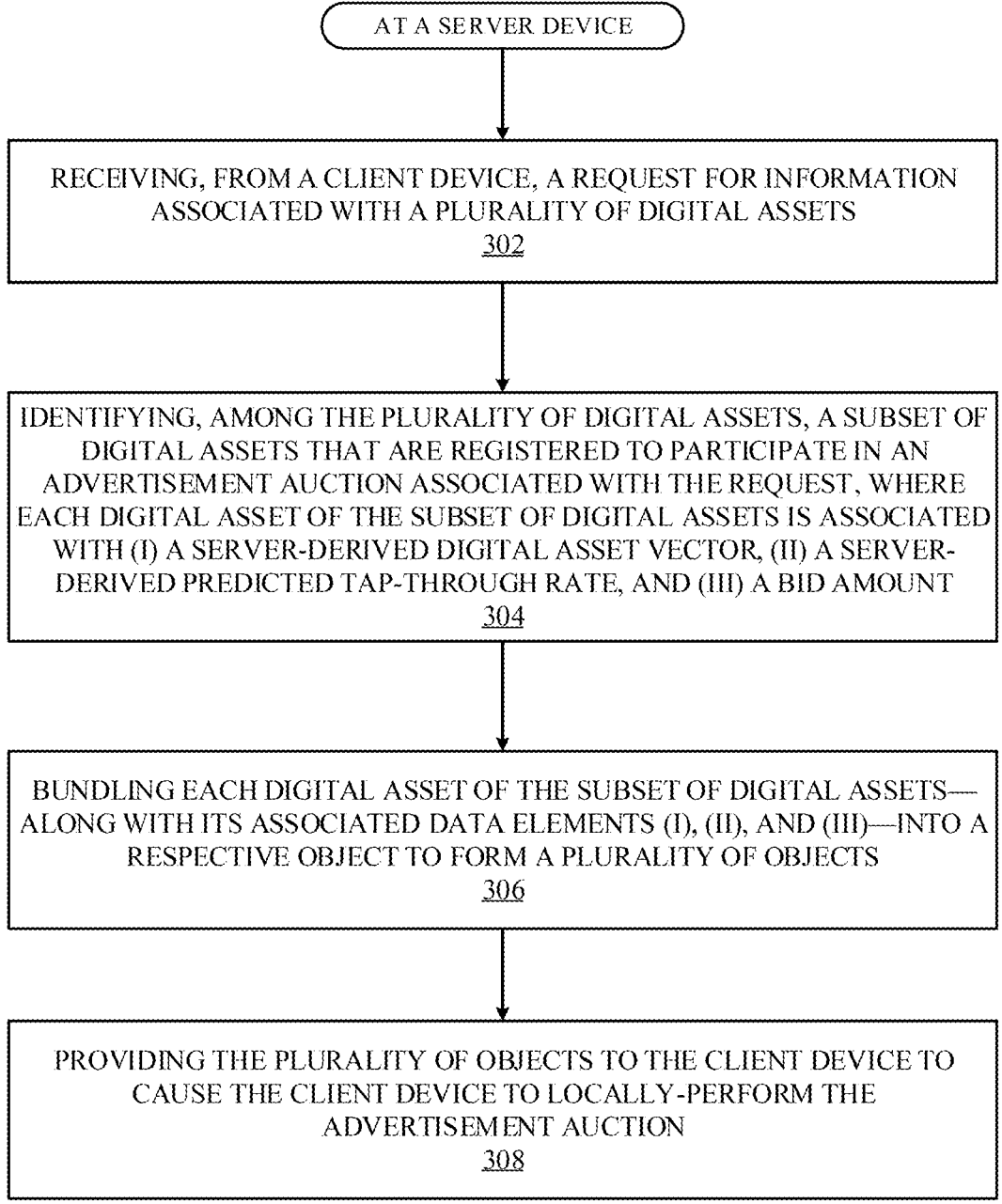
FIG. 3 illustrates a method for a server device to enable a client device to perform an advertisement auction, according to some embodiments.

FIG. 3 illustrates a method 300 for a server device 110 to enable a client device 130 to perform an advertisement auction, according to some embodiments. As shown in FIG. 3, the method 300 begins at step 302, where the server device 110/information engine 113 receives, from the client device 130, a request for information associated with a plurality of digital assets (e.g., as described above in conjunction with FIG. 2A).

Step 304 involves the information engine 113 identifying, among the plurality of digital assets, a subset of digital assets that are registered to participate in an advertisement auction associated with the request, where each digital asset of the subset of digital assets is associated with (i) a server-derived digital asset vector, (ii) a server-derived predicted tap-through rate, and (iii) a bid amount (e.g., as described above in conjunction with FIG. 2B).

Step 306 involves the information engine 113 bundling each digital asset of the subset of digital assets—along with its associated data elements (i), (ii), and (iii)—into a respective object to form a plurality of objects (e.g., as described above in conjunction with FIG. 2C). Additionally, step 308 involves the information engine 113 providing the plurality of objects to the client device to cause the client device to locally-perform the advertisement auction (e.g., as also described above in conjunction with FIG. 2C).

Figure 4:
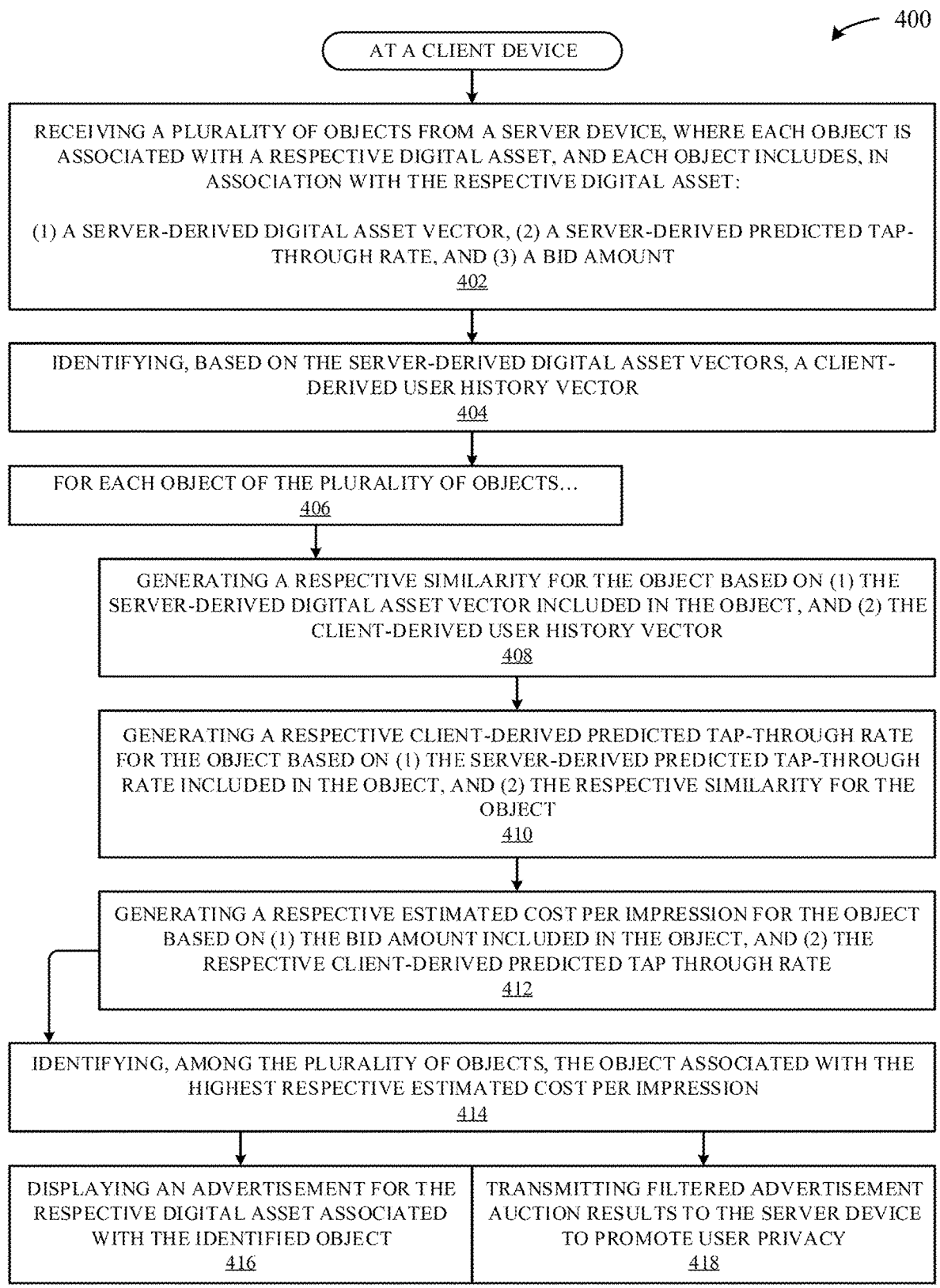
FIG. 4 illustrates a method for implementing an advertisement auction at the client device, according to some embodiments.

FIG. 4 illustrates a method 400 for implementing an advertisement auction at the client device 130, according to some embodiments. As shown in FIG. 4, the method 400 begins at step 402, and involves the information engine 136 receiving a plurality of objects from the server device 110, where each object is associated with a respective digital asset, and each object includes, in association with the respective digital asset: (1) a server-derived digital asset vector, (2) a server-derived predicted tap-through rate, and (3) a bid amount (e.g., as described above in conjunction with FIG. 2C).

At step 404, the information engine 136 identifies, based on the server-derived digital asset vectors, a client-derived user history vector (e.g., as described above in conjunction with FIG. 2C). At step 406, the information engine 136 begins a looping function to process each of the objects in accordance with steps 408-412. In particular, at step 408, the information engine 136 generates a respective similarity for the object based on (1) the server-derived digital asset vector included in the object, and (2) the client-derived user history vector (e.g., as described above in conjunction with FIG. 2D). At step 410, the information engine 136 generates a respective client-derived predicted tap-through rate for the object based on (1) the server-derived predicted tap-through rate included in the object, and (2) the respective similarity for the object (e.g., as described above in conjunction with FIG. 2E). At step 412, the information engine 136 generates a respective estimated cost per impression for the object based on (1) the bid amount included in the object, and (2) the respective client-derived predicted tap through rate (e.g., as described above in conjunction with FIG. 2F).

At step 414—which represents the conclusion of the aforementioned loop performed on the plurality of objects— the information engine 136 identifies, among the plurality of objects, the object associated with the highest respective estimated cost per impression (e.g., as also described above in conjunction with FIG. 2F). At step 416, the information engine 136 causes an advertisement for the respective digital asset associated with the identified object to be displayed (e.g., as further described above in conjunction with FIG. 2F). Additionally, at step 418, the information engine 136 transmits filtered advertisement auction results to the server device 110 to enable the server device 110 to update its machine learning models where appropriate (e.g., as described above in conjunction with FIGS. 2A and 2G).

The embodiments additionally set forth a technique for receiving a plurality of objects from a server device, where each object of the plurality of objects is associated with a respective digital asset, and includes: (i) respective media content associated with the respective digital asset, and (ii) a respective threshold that identifies when the respective media content should be displayed on the client device. The technique further includes, for each object of the plurality of objects: modifying the respective threshold based on user history data that is accessible to the client device to produce a respective modified threshold. Additionally, the technique includes identifying a particular object of the plurality of objects based on the respective modified thresholds of the plurality of objects, and causing the client device to display the respective media content for the particular object.

FIG. 5 illustrates a detailed view of a computing device 500 that can be used to implement the various components described herein, according to some embodiments. In particular, the detailed view illustrates various components that can be included in the server device 110/client device 130 and the illustrated in FIG. 1A. As shown in FIG. 5, the computing device 500 can include a processor 502 that represents a microprocessor or controller for controlling the overall operation of the computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, and so on. Still further, the computing device 500 can include a display 510 that can be controlled by the processor 502 to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include a wireless transceiver.

As noted above, the computing device 500 also include the storage device 540, which can comprise a single disk or a collection of disks (e.g., hard drives), and includes a storage management module that manages one or more partitions within the storage device 540. In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of applications executing on the server device 110/client device 130.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling client devices to locally-perform advertisement auctions to improve user privacy, the method comprising, by a server device:
   receiving, from a client device, a request for information associated with a plurality of digital assets;
   identifying, among the plurality of digital assets, a subset of digital assets that are registered to participate in an advertisement auction based on the request, wherein each digital asset of the subset of digital assets includes:
   (i) respective media content associated with the digital asset, and (ii) a respective threshold that identifies a respective likelihood that the respective media content will be selected when displayed on the client device;
providing the subset of digital assets to the client device to cause the client device to:
  locally-perform the advertisement auction by analyzing the subset of digital assets against user history data that is accessible to the client device but not accessible to the server device,
  display, on at least one display device with which the client device is communicatively coupled, media content associated with at least one of the digital assets of the subset of digital assets, and
  provide, to the server device, filtered feedback information that omits the user history data; and
utilizing the filtered feedback information to adjust the manner in which respective thresholds for digital assets are generated in response to subsequent requests for information associated with the digital assets.

2. The method of claim 1, wherein each digital asset of the subset of digital assets further includes:
  (i) a respective server-derived digital asset vector, and
  (ii) a respective bid amount that influence the manner in which the client device locally-performs the advertisement auction.

3. The method of claim 2, wherein, for a given digital asset of the subset of digital assets, the respective server-derived digital asset vector includes a plurality of characteristics associated with the digital asset.

4. The method of claim 1, wherein, for a given digital asset of the subset of digital assets, the respective threshold comprises a server-derived predicted tap-through rate that:
  (i) is based on the request, and
  (ii) represents a likelihood that a user of the client device will select the respective media content.

5. The method of claim 1, wherein the filtered feedback information includes estimated cost per impression metrics managed by the client device.

6. The method of claim 1, wherein the user history data includes at least one user history vector, at least one similarity value, and at least one predicted tap through rate associated with a user of the client device.

7. The method of claim 1, further comprising, prior to providing the subset of digital assets to the client device:
  encrypting the subset of digital assets using an encryption key that is accessible to both the client device and the server device.

8. A non-transitory computer readable storage medium configured to store instructions that, when executed by a processor included in a server device, cause the server device to enable client devices to locally-perform advertisement auctions to improve user privacy, by carrying out steps that include:
  receiving, from a client device, a request for information associated with a plurality of digital assets;
  identifying, among the plurality of digital assets, a subset of digital assets that are registered to participate in an advertisement auction based on the request, wherein each digital asset of the subset of digital assets includes:
    (i) respective media content associated with the digital asset, and
    (ii) a respective threshold that identifies a respective likelihood that the respective media content will be selected when displayed on the client device;
  providing the subset of digital assets to the client device to cause the client device to:
    locally-perform the advertisement auction by analyzing the subset of digital assets against user history data that is accessible to the client device but not accessible to the server device,
    display, on at least one display device with which the client device is communicatively coupled, media content associated with at least one of the digital assets of the subset of digital assets, and
    provide, to the server device, filtered feedback information that omits the user history data; and
  utilizing the filtered feedback information to adjust the manner in which respective thresholds for digital assets are generated in response to subsequent requests for information associated with the digital assets.

9. The non-transitory computer readable storage medium of claim 8, wherein each digital asset of the subset of digital assets further includes:
  (i) a respective server-derived digital asset vector, and
  (ii) a respective bid amount that influence the manner in which the client device locally-performs the advertisement auction.

10. The non-transitory computer readable storage medium of claim 9, wherein, for a given digital asset of the subset of digital assets, the respective server-derived digital asset vector includes a plurality of characteristics associated with the digital asset.

11. The non-transitory computer readable storage medium of claim 8, wherein, for a given digital asset of the subset of digital assets, the respective threshold comprises a server-derived predicted tap-through rate that:
  (i) is based on the request, and
  (ii) represents a likelihood that a user of the client device will select the respective media content.

12. The non-transitory computer readable storage medium of claim 8, wherein the filtered feedback information includes estimated cost per impression metrics managed by the client device.

13. The non-transitory computer readable storage medium of claim 12, wherein the user history data includes at least one user history vector, at least one similarity value, and at least one predicted tap through rate associated with a user of the client device.

14. The non-transitory computer readable storage medium of claim 8, wherein the steps further include, prior to providing the subset of digital assets to the client device:
  encrypting the subset of digital assets using an encryption key that is accessible to both the client device and the server device.

15. A server device configured to enable client devices to locally-perform advertisement auctions to improve user privacy, the server device comprising at least one processor configured to cause the server device to carry out steps that include:
  receiving, from a client device, a request for information associated with a plurality of digital assets;
  identifying, among the plurality of digital assets, a subset of digital assets that are registered to participate in an advertisement auction based on the request, wherein each digital asset of the subset of digital assets includes:
    (i) respective media content associated with the digital asset, and
    (ii) a respective threshold that identifies a respective likelihood that the respective media content will be selected when displayed on the client device;
  providing the subset of digital assets to the client device to cause the client device to:

locally-perform the advertisement auction by analyzing the subset of digital assets against user history data that is accessible to the client device but not accessible to the server device,
display, on at least one display device with which the client device is communicatively coupled, media content associated with at least one of the digital assets of the subset of digital assets, and
provide, to the server device, filtered feedback information that omits the user history data; and
utilizing the filtered feedback information to adjust the manner in which respective thresholds for digital assets are generated in response to subsequent requests for information associated with the digital assets.

16. The server device of claim 15, wherein each digital asset of the subset of digital assets further includes:
(i) a respective server-derived digital asset vector, and
(ii) a respective bid amount that influence the manner in which the client device locally-performs the advertisement auction.

17. The server device of claim 16, wherein, for a given digital asset of the subset of digital assets, the respective server-derived digital asset vector includes a plurality of characteristics associated with the digital asset.

18. The server device of claim 15, wherein, for a given digital asset of the subset of digital assets, the respective threshold comprises a server-derived predicted tap-through rate that:
(i) is based on the request, and
(ii) represents a likelihood that a user of the client device will select the respective media content.

19. The server device of claim 15, wherein the filtered feedback information includes estimated cost per impression metrics managed by the client device.

20. The server device of claim 19, wherein the user history data includes at least one user history vector, at least one similarity value, and at least one predicted tap through rate associated with a user of the client device.

* * * * *